(No Model.)
T. J. BROWN & G. McGOWAN.
FRUIT DRIER.
No. 270,278. Patented Jan. 9, 1883.
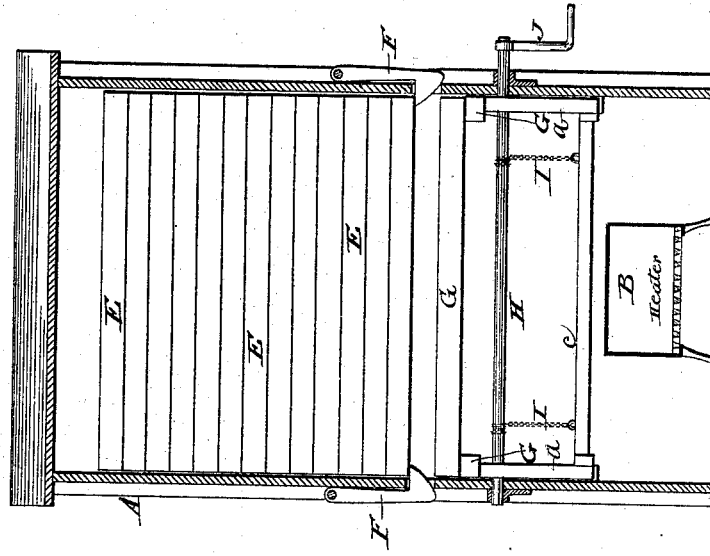
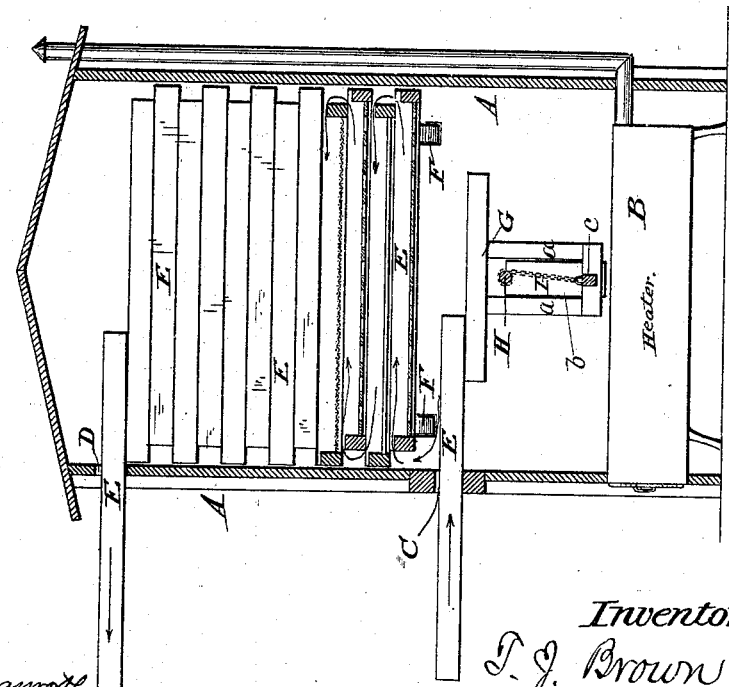
Attest.
Sidney P. Hollingsworth
J. P. Town
Inventors.
T. J. Brown
Guy McGowan
By Philip T. Dodge
Atty.

UNITED STATES PATENT OFFICE.

THOMAS J. BROWN AND GUY McGOWAN, OF PENFIELD, NEW YORK.

FRUIT-DRIER.

SPECIFICATION forming part of Letters Patent No. 270,278, dated January 9, 1883.

Application filed June 5, 1882. (No model.)

*To all whom it may concern:*

Be it known that we, T. J. BROWN and GUY McGOWAN, of Penfield, in the county of Monroe and State of New York, have invented certain Improvements in Fruit-Driers, of which the following is a specification.

Our invention relates to fruit-driers wherein a series of trays are arranged one upon another and in which provision is made for introducing the trays one beneath another at the foot of the apparatus and gradually elevating the series through the body while subjected to an ascending current of heated air, so that as the trays containing fresh fruit are introduced at the bottom those containing the dried fruit may be removed successively at the top.

The invention consists in the peculiar construction and arrangement of parts, hereinafter described.

Referring to the accompanying drawings, Figure 1 represents a vertical section through our improved drier, and Fig. 2 is a vertical section at right angles to the first.

A represents an upright rectangular case or body, which may be constructed in any suitable manner, preferably with a roof or covering at its upper end, and with a stove or other heater, B, of any ordinary or suitable construction, in its base.

Near its base the body is provided at one side with an opening, C, through which the horizontal trays are inserted, and near its top it is provided with a similar opening, D, through which the trays are removed after being elevated through the body.

The trays E consist of wire-gauze, transverse slats, or other suitable surfaces to sustain the fruit but permit the free passage of air through and around the same, each tray being made of suitable size to cross or substantially cross the interior of the body in both directions.

On opposite sides of the body, near its base, there are hinged depending hooks F, the lower ends of which are beveled and permitted to extend through openings in the sides of the body, so as to project on the inside of the same, as clearly represented in Fig. 2. These hooks are designed to engage beneath the successive trays as they are elevated, and by supporting the bottom of the tray to sustain the entire column of trays resting thereon.

In the base of the apparatus I mount a vertically-sliding frame, G, designed to effect the elevation of the trays.

It will be observed that the frame G is provided at each end with two depending arms, a, which are arranged to slide against opposite sides of a vertical guide-block, b, secured rigidly to the walls of the structure. The arms a, at opposite sides of the frame, are connected with each other by a cross-bar, c.

A shaft, H, passed transversely through the machine from side to side, is provided on the under side with chains I, which are connected to the cross-bar c, as shown, to elevate the sliding frame, and provided on the outer end with a hand-crank, J, by which it is turned.

It will be perceived that all the parts employed for the elevation of the lifting-frame are located within and protected by the external structure.

The action of the apparatus is as follows: By turning the crank J backward the frame G is permitted to descend below the level of the inlet-opening C, after which a tray is inserted through said opening and permitted to rest on top of the frame. The crank J is then turned in a forward direction, elevating the frame G and causing it to lift the tray thereon until the hooks F engage beneath and sustain said tray, whereupon the frame G is again lowered away from the tray and another tray inserted beneath the first upon the frame, after which the frame is again elevated and the second tray raised until it is in turn sustained by the hooks, the elevation of the second tray at the same time elevating those which rest above it. By thus inserting trays one after another it will be seen that the entire series is carried gradually upward through the body while subjected to a drying action. As the column of trays is elevated those at the top are removed one after another through the opening D.

It is preferred, as shown in the drawings, to make the trays in one direction slightly shorter than the width of the case and set them alternately to the right and left in such manner that the air will ascend in a zigzag path between the ends of the successive trays, as indicated.

We are aware that dry-houses have been constructed in various forms wherein means were provided for progressively elevating a series of trays inserted one after another at the base, and this we do not broadly claim. We are not aware, however, that anyone has hitherto constructed and arranged the details in the manner represented in the drawings. It will be perceived that all the operative parts are inclosed and protected within the building.

Having thus described our invention, what we claim is—

1. In combination with the external structure, A, the gravitating hooks F, having their lower ends beveled and extending through the walls of the structure, and the vertically-sliding frame G, connected by chains I with the shaft H, having an external crank or operating device.

2. In a dry-house, the combination of the internal lifting-frame, G, having depending arms $a$, guide-blocks $b$, the cross-bar $c$, and the chains I, and the transverse shaft H, provided with a hand-crank, J.

THOMAS JEFFERSON BROWN.
GUY McGOWAN.

Witnesses:
G. H. BACON,
JAS. H. ECKLER.